United States Patent

[11] 3,622,963

| [72] | Inventor | George E. Sage<br>Redmond, King, Wash. |
|---|---|---|
| [21] | Appl. No. | 794,932 |
| [22] | Filed | Jan. 29, 1969 |
| [45] | Patented | Nov. 23, 1971 |
| [73] | Assignee | Honeywell Inc.<br>Minneapolis, Minn. |

[54] SCANNING POLARITY COINCIDENCE CORRELATOR
8 Claims, 2 Drawing Figs.

[52] U.S. Cl. .................................................. 340/6 R,
340/16 R, 343/100 CL, 343/113 R
[51] Int. Cl. ..................................................... G01s 3/00

[50] Field of Search................................................. 340/3, 6,
16; 343/7 RS, 7.4, 113, 100.7

[56] References Cited
UNITED STATES PATENTS
| 3,160,850 | 12/1964 | Dudley................... | 340/6 |
| 3,197,770 | 7/1965 | Rix et al.................. | 343/7.4 X |

Primary Examiner—Richard A. Farley
Attorneys—Charles J. Ungemach, Ronald T. Reiling and Charles L. Rubow ABSTRACT: Apparatus utilizing polarity coincidence for determining direction of an object from a set of transducers and further utilizing a pair of correlating circuits to distinguish a true signal from multipath signals.

3,622,963

CONTROL APPARATUS

THE INVENTION

This invention is concerned generally with electronics and more specifically with a sound-detecting device.

In the prior art there are polarity coincidence correlators such as the one described in IEEE transactions Jan. 1963, page 18 in an article entitled, "Polarity Coincidence Correlation Detection of a Weak Noise Source" by Helge Erkre. This article, however, only generally discloses the use of correlation detection. No specific implementation is disclosed, nor is any specific technique described for rejecting multipath signals from a plurality of received signals.

It has been determined that the correct signal among a plurality of signals generated by a noise source is normally the signal which most nearly follows the horizontal path. This is because multipath signals are caused by reflections from surfaces such as the ground or water bed, or from an upper limit boundary such as the surface of the water or a layer of clouds or ionized atmosphere. In reflecting from these surfaces and toward the receiving unit, the angle of the reflected signal path relative to horizontal is greater than the angle of the direct signal path relative to horizontal. It is to be realized that under certain conditions a multipath signal could be more nearly horizontal, but these instances are exceptional and are normally of a much smaller amplitude than the direct or true signal.

It is therefore an object of this invention to provide improved signal detection apparatus.

Further objects and advantages of the invention will be apparent from a reading of the specification and appended claims in conjunction with the drawings wherein:

Figure 1:
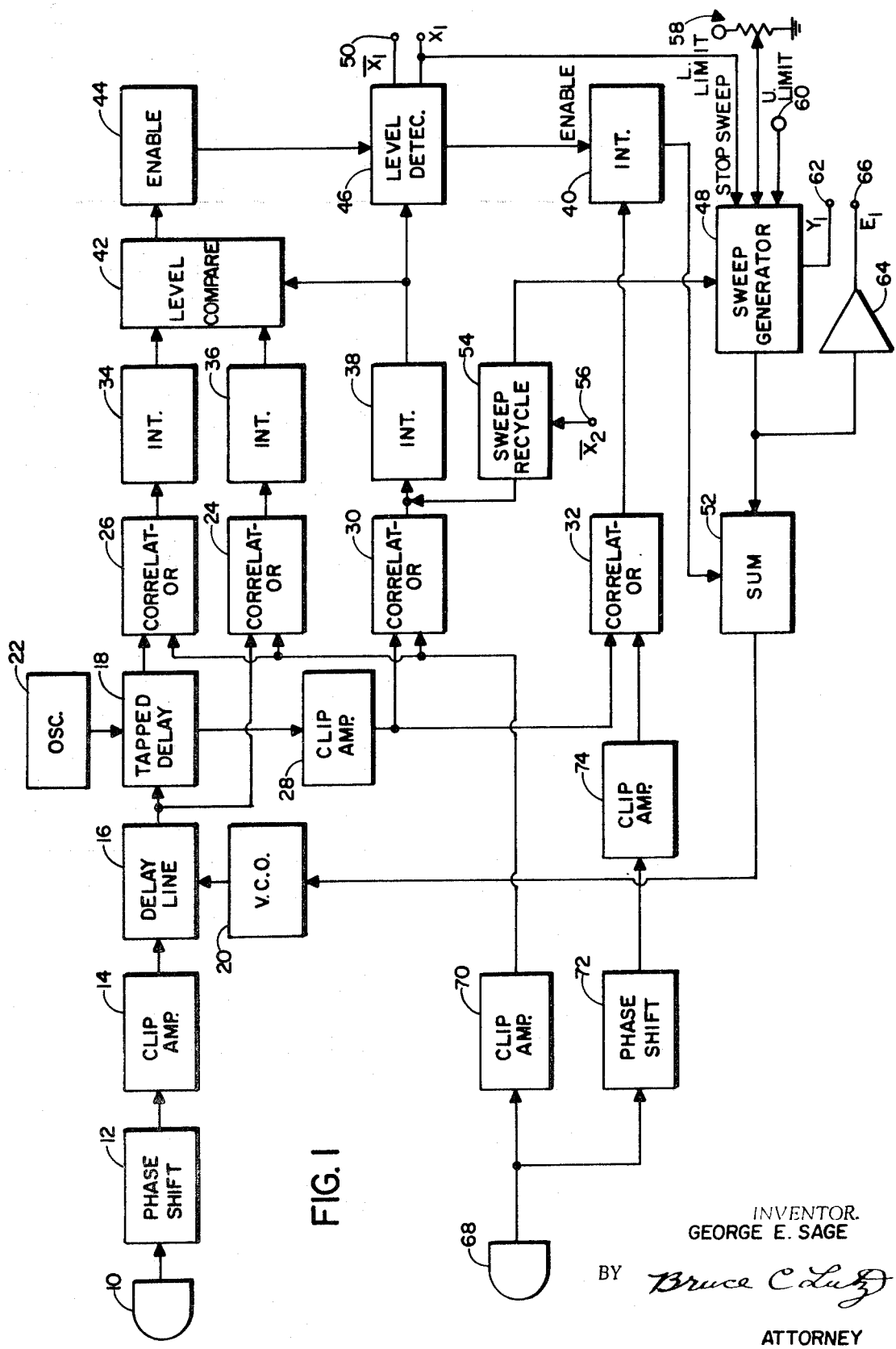
FIG. 1 is a schematic block diagram of an individual scanning unit.

In FIG. 1, a first transducer 10 supplies signals to a phase-shifting block 12 which transmits the phase-shifted signals to a clipping amplifier 14. The output from the clipping amplifier 14 is applied through a delay line 16, which may take the form of a shift register, to a further tapped delay line 18. The tapped delay line may also take the form of a shift register or two shift registers. Each of the delay lines 16 and 18 use oscillators to shift the signal therethrough. A voltage-controlled oscillator (VCO) 20 is used to shift the signal through delay line 16 while an oscillator 22 is utilized to shift the signal through delay line 18. The output from delay line 16 is also supplied to a correlator circuit 24 while an output from tapped delay line 18 is also supplied to a correlator 26. A signal from an intermediate point on tapped delay line 18 is supplied to a clipping amplifier 28 whose output is supplied to a pair of correlators 30 and 32. Each of the correlators may take the form of a simple "exclusive OR-gate." The outputs of correlators 26, 24, 30 and 32 are supplied to integrators 34, 36, 38 and 40 respectively. The outputs from integrators 34, 36 and 38 are all supplied to a level compare circuit 42 which compares the inputs from integrators 34 and 36 with the input from integrator 38 and supplies an output to an enable circuit 44 when the output from integrator 38 is lower than either of the other two inputs to circuit 42. The enable circuit 44 enables a level detector 46 to pass a signal from integrator 38 therethrough to a sweep generator 48. The level detector 46 also supplies an output to a terminal 50 which is labeled $\overline{X}_1$. Further level detector 46 supplies an enable signal to integrator 40 so as to allow passage of a signal from correlator 32 through integrator 40 to a summing network 52.

A sweep recycle lock 54 has an input 56 labeled $\overline{X}_2$ and has a first output to the input of integrator 38 and a second output to sweep generator 48. A lower limit potentiometer generally designated as 58 supplies input signals to sweep generator 48 which has a further upper limit input 60. The signal at 60 limits the maximum amplitude of the sweep signal. The sweep generator 48 also has a $Y_1$ input labeled 62. An output of sweep generator 48 is supplied to the summing network and is also supplied through an inverting amplifier 64 to an $E_1$ output 66. The summing amplifier 52 supplies an output to the VCO 20.

A second transducer 68 supplies an input signal to a clipping amplifier 70 and also a signal to a phase-shifting network 72. Output signals from clipping amplifier 70 are supplied to correlators 26, 24 and 30. An output signal from phase shifter 72 is supplied through a clipping amplifier 74 to correlator 32.

Figure 2:
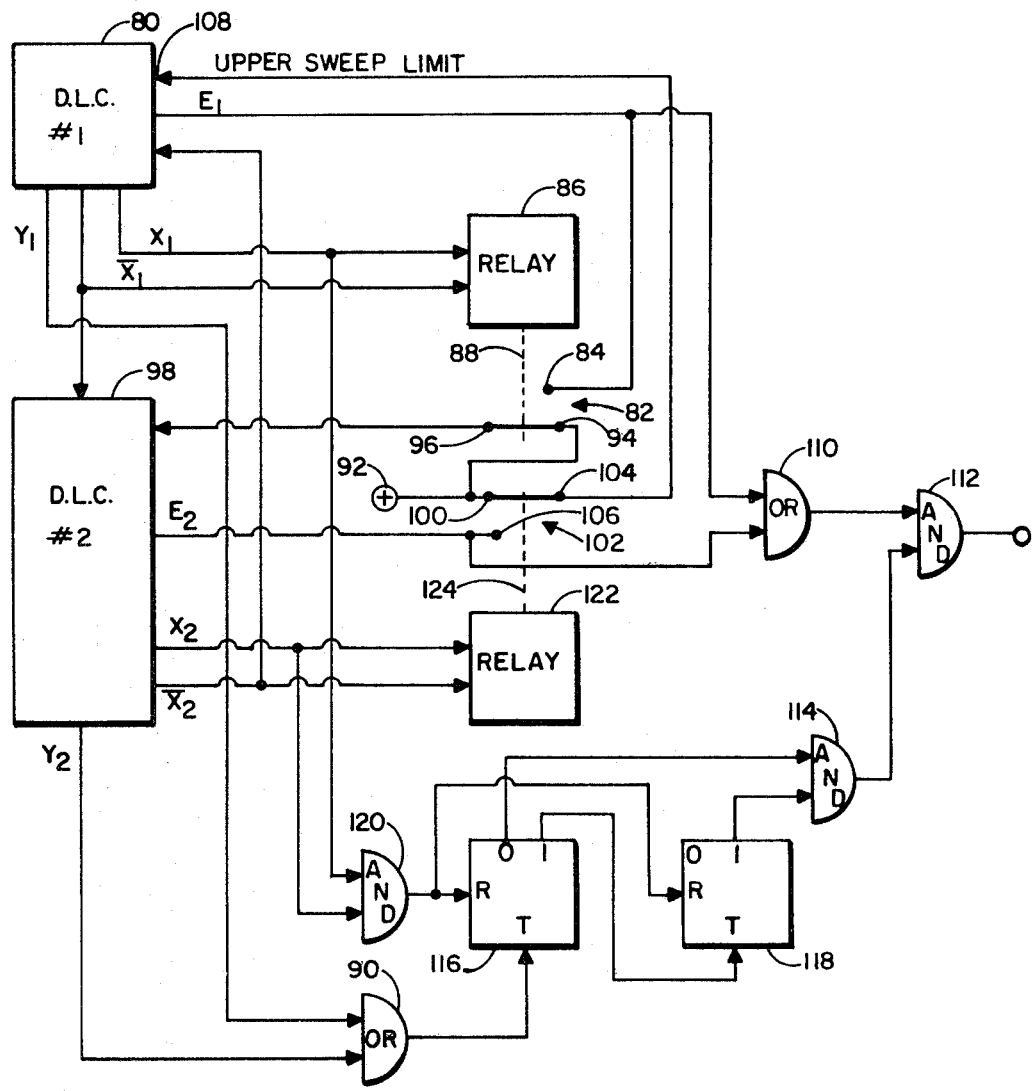
FIG. 2 is a system block diagram of the multipath rejection and selection circuitry.

In FIG. 2 two delay local correlators (DCLs) are shown. each one containing the apparatus of FIG. 1. DLC 1 is labeled 80 and has a first output labeled $E_1$ which supplies signals to a switch 82 at an input terminal or stationary contact 84. DLC 80 also has an output labeled $X_1$ which supplies switching signals to a relay 86 which controls switch 82 via a mechanical connector represented by a dashed line 88. In addition DLC 80 has an output labeled $Y_1$ which supplies an input signal to an OR-circuit 90.

A stationary contact or terminal 94 of switch 82 receives signals representing maximum sweep from power terminal 92. A movable switch contact or element 96 is switched by means of relay 86 between terminals 84 and 94 to alternately supply signals to DLC 80 and a second DLC which is identified by numeral 98. Terminal 92 also supplies an upper sweep limit signal to a stationary contact or terminal 100 of a further switch generally designated as 102 having a movable contact 104 which moves between terminal 100 and a terminal 106. Terminal 106 is connected directly to an output $E_2$ of DLC 98. Movable contact 104 is connected to an upper sweep limit input 108 of DLC 80. Output $E_2$ of DLC 98 is supplied to a first input of an OR-circuit 110. A second input to OR-circuit 110 is supplied from output $E_1$ of DLC 80. An output from OR-circuit 110 is supplied to an AND-circuit 112 which receives a second input from an AND-circuit 114.

DLC 98 has an output labeled $Y_2$ which is supplied to OR-circuit 90. An output of OR-circuit 90 is supplied to a toggle input of a flip-flop 116. A 1 (one) output from flip-flop 116 is supplied to a toggle input of a flip-flop 118. Outputs $X_1$ and $X_2$ from DLCs 80 and 98 respectively are supplied to inputs of an AND-circuit 120 which has an output supplied to the reset inputs of flip-flops 116 and 118. A 0 (zero) output of flip-flop 116 is supplied as a first input to the AND-circuit 114, while an 1 output from flip-flop 118 is supplied as a second input to AND-circuit 114. Each of the DLCs 80 and 98 have a second output indicated as $\overline{X}_1$ and $\overline{X}_2$ supplied to the relays 86 and 122 respectively. DLC 98 also has an $X_2$ input to relay 122 which controls switch 102 via a mechanical connection represented by a dashed line 124. The $\overline{X}$ outputs provide signals that are complementary to the signals at the corresponding X outputs, or absent when signals are present at the corresponding X outputs depending on circuit design.

OPERATION

In operation, the transducers 10 and 68 of FIG. 1 may either be separate single transducers, or each may be a plurality of transducers depending upon the sensitivity and directivity desired. An incoming signal is received by the two transducers 10 and 68. If the signal is horizontal, it will be received by both transducers at the same time. However, if it is at any angle from horizontal, the two transducers will receive the same portion of the signal at different times. The delay line 18 is used in combination with correlators 24–32 to determine when the delay of delay line 16, and hence the electrical directivity of the transducers, is adjusted so that the transducers effectively point directly at the sound source.

The incoming signal received at transducer 10 is phase shifted 90° in block 12 for purposes of facilitating the feedback network operation. The signal is then clipped in clipping amplifier 14 to produce a standard amplitude signal. This standard amplitude signal is then sampled by the delay line 16 which, as previously mentioned, is merely a shift register. The shift register 16 is operated at least two times faster than the highest frequency in the incoming signal. In one embodiment, it was operated at approximately ten times the incoming signal frequency variation. With more than two times the maximum frequency variation in the sampling signal, there is very little inaccuracy involved. The VCO will vary the sampling frequency from much lower than that of the tapped delay line 18 to much higher. When the received sound is directly horizontal from the two transducers 10 and 68, the total phase shift from transducer 10 to the tapped output of delay line 18, as supplied to clipping amplifier 28, will be exactly 360° or a multiple thereof. It may be assumed for the moment that the sound source is directly horizontal. Therefore the signal applied to correlator 26 from tapped delay line 18 is delayed more than 360 electrical degrees. The input to correlator 24 from delay 16 is delayed less than 360° Thus, these signals will not correlate very well with the signal being obtained from transducer 68 through clipping amplifier 70. Thus, the correlators 24 and 26 will provide a high-level output indicative of low correlation to level comparator 42 since with exclusive OR-circuits there would be an output every time there was no correlation. On the other hand, the phasing of the input from the tapped delay line 18 as applied to clipping amplifier 28 will correlate almost exactly with the input from transducer 68. Thus, correlator 30 will indicate a high correlation and will have a low-level output which will be transmitted to the level comparator 42. The circuit level comparator 42 will provide an output to the enable circuit 44 when the output from integrator 38 is lower than either of the outputs from 34 or 36. The level comparator 42 can comprise two level detectors each comparing the input from 38 with one of the inputs from integrators 34 and 36. An AND-gate at the output of level comparator 42 can be used to indicate that in both instances the output from 38 is lower.

As will be realized, this portion of the circuitry, including the correlators and the comparator, can be implemented in other ways, such as with AND-circuits in the correlators. Under the desired operating conditions, integrator 38 would then have a higher output than that obtained from the integrators 34 and 36 instead of a lower output as indicated above. With an output from enable circuit 44 to the level detector 46, an output is supplied to the sweep generator 48 to stop its operation. Previously, generator 48 had been supplying a signal through the summing network 52 to the VCO 20 to electrically scan a volume of fluid or space until the correlator 30 received signals from both transducers 10 and 68 substantially simultaneously. Assuming the correlators are implemented with AND-circuits, if the signal from integrator 38 is high enough to satisfy level detector 46, detector 46 provides a signal to stop the sweep generator 48. The input signals from transducer 68 are phase shifted 90° by phase shifter 72 and applied through a clipping amplifier 74 to the correlator 32. With a 90° phase shift and with perfect correlation appearing at correlator 30, there should be no correlation between the two input signals supplied to correlator 32. This would then provide not output, if AND-circuits are used for correlation, to integrator 40, and thus provide no alteration of the output of integrator 40 that is supplied to the VCO 20 through summing network 52. However, if the sound source moves there will be a change in reception of the signals at transducers 10 and 68, thus producing some correlation at transducer 30. Any amount of correlation will produce an output which is integrated in integrator 40 after being enabled by the level detector 46. This will change the frequency of operation of VCO 20 so as to change the total delay time to clipping amplifier 28, and thus through feedback action, will again produce no correlation at the inputs to correlator 32. The integrator 40 is of course enabled only when the level of the input signal from integrator 38 is of a reasonably high level. The sweep generator 48 has a lower sweep limit as determined by potentiometer 58 and an upper sweep limit as determined by input signals supplied to terminal 60. These can be voltage signals supplied by a power supply, or some other effective way of limiting maximum amplitude of the signal sweep generator produced by 48.

An output from sweep generator 48 is supplied to terminal 62. This signal indicates that the sweep signal has reversed its direction of sweep. When utilizing a sawtooth, this can be accomplished by supplying the signals not only to the output of the sweep generator, but also through a differentiator and a circuit which passes signals of only one polarity to the output 62. Thus an output pulse will be obtained once each cycle of the sweep generator. The output of the sweep generator 48 is also supplied through inverting amplifier 64 to supply and $E_1$ output which is used as an upper sweep limit for a second delay lock correlator circuit. The input 60 corresponds to the $E_1$ input of the second DLC. The output at terminal 50 is an $\overline{X}_1$ output and is indicative of the fact that the input signals are correlated enough to enable the correlator to lock on to the sound source and vary the VCO to keep its electrical directivity effectively pointed at the sound source. As a result of the previously described feedback arrangement the output $E_1$ at terminal 66 will vary in amplitude as the sound source moves in position thus varying the upper sweep limit of the second correlator.

When one of the correlators such as that represented by block 80 in FIG. 2, has locked onto a signal, an output appears on $\overline{X}_1$ as an input to DLC 98 for actuating the sweep recycle block, thereby discharging the integrator corresponding to integrator 38 and actuating the sweep generator corresponding to generator 48. An output will appear on lead $X_1$ to actuate relay 86, thus providing the output $E_1$ from DLC 80 to DLC 98 and providing an upper limit of $E_1$ for the sweep generator in DLC 98.

DLC 98 will sweep until it finds a source of signal between the limits set up for it by the lower limit potentiometer and the upper limit set up by the previously found signal. If DLC 98 finds a signal source which is at a smaller angle with respect to horizontal then the signal detected by DLC 80, it will then actuate relay 122. Upon locking onto the new signal, DLC 98 will supply an upper limit signal $E_2$ through the switch 102 to DLC 80. It will also supply an $\overline{X}_2$ signal as an input to DLC 80 to start the sweep recycle process by discharging the capacitor in integrator 38 and allowing sweep generator 48 to vary its output signal within the newly prescribed limits. After the correct signal has been found, the other DLC, such as DLC 98, will continue sweeping looking for a further signal which is nearer to horizontal.

As each DLC unit locks onto a new signal, a signal from the X output is supplied through AND-circuit 120 to reset the two flip-flops 116 and 118 to their initial states. As the scanning DLC completes each cycle, an output will be supplied through the OR-circuit 90 to the toggle input of flip-flop 116. The first complete cycle will provide an output to toggle flip-flop 118. In this state there will be an input at the two 1 outputs from the two flip-flops and there will be only one input and AND 114. However, upon the next complete cycle flip-flop 116 will again provide an output at the 0 terminal while 118 provides a 1 output. The condition required to cause AND 114 to provide an output to AND-gate 112 is thus present. A signal at the E output of either DLC 80 or 98 is supplied through OR-circuit 110 to AND-circuit 112 when either DCL is locked onto a sound source. Thus, the AND-circuit 112 is satisfied with two inputs. Accordingly, it passes as an output, a signal indicative of the angle from which the sound has been received. The amplitude of this signal is, of course, indicative of the angle of reception.

So far, the circuitry has been described as useful only for the detection of sounds. However, the apparatus can be used in a pulse echo detection system with modifications readily apparent to those skilled in the art. Further, the embodiment shown is only one of many implementations. While the description has used the horizon as the reference nearest to which the true signal is found, it is readily conceivable that in some situations the true signal would have an orientation other than nearly horizontal. Such an instance would occur in utilizing the equipment with a pulse echo system wherein the most probably correct signal would ordinarily be received from a direction perpendicular to the wave front from the pulse-transmitting apparatus.

The present invention may be practiced with circuitry connected in various ways and I wish to be limited only by the following claims, wherein:

I claim:

1. A pulse echo detection system for use in conjunction with pulse transmission apparatus which transmits signals having a given wave front into a volume of fluid, the detection system for determining the most direct return signal while rejecting multipath signals, the detection system comprising, in combination:

first detecting means for scanning the volume of fluid for a return signal, said first means ceasing scanning upon detecting a return signal at an angle of incidence with respect to said given wave front and supplying an enabling signal; and second detecting means for scanning the volume of fluid for a further return signal at a smaller angle of incidence than the last detected return signal upon receipt of said enabling signal, the second detecting means upon detecting a return signal, ceasing scanning and enabling said first detecting means to scan to the volume for further signals, the alternate enabling of detecting means, and scanning of smaller volumes continuing until the smallest angle of incidence return signal is found, indicating the most direct return signal.

2. Signal-searching apparatus for rejecting multipath signals from a signal source means comprising, in combination:

first source signal detection means for directively searching a volume at various angles from a reference angle and for providing an output first signal upon reception of a signal from said source means; and second source signal detection means for directively further searching between said reference angle and the angle of reception of said first detection means for further signals from said source means, said second detection means upon detection of another signal at an angle closer to said reference angle providing an output second signal enabling said first detection means to commence a further search between said reference angle and the angle of said "another signal."

3. Apparatus as defined in claim 2 wherein said reference angle is horizontal and wherein means is included for providing an output signal indicative of the angle with respect to horizontal of the last-detected signal after further signals cannot be found within a predetermined time period.

4. Apparatus as claimed in claim 2 wherein one of said first and second signal source detection means includes:

first transducer means for providing an output first signal upon reception of an acoustic signal;

phase-shifting means for phase shifting said first signal to produce a second signal;

variable delay means connected to said phase-shifting means for receiving said second signal and for providing a variable delayed output third signal in response to a control fourth signal;

further delay means connected to said variable delay means for receiving said third signal and providing output fifth and sixth signals wherein said fifth signal is delayed more than said sixth signal;

second transducer means for providing an output seventh signal in response to received acoustic signals; and correlation means connected to said first and second transducer means and said delay means for receiving said third, fifth, sixth, and seventh signals and providing an apparatus output signal when the correlation between said sixth and seventh signals is greater than the correlation of said seventh signal with either of said third and fifth signals, said correlation means also providing the control fourth signal for application to said variable delay means to vary the delay of said third signal with respect to said second signal to maintain the correlation of said seventh and sixth signals at a higher level than the correlation of said seventh signal with either of said third and fifth signals.

5. Signal detection and indication apparatus comprising, in combination:

first transducer means for providing an output first signal upon reception of an acoustic signal;

phase-shifting means for phase shifting said first signal to produce a second signal;

variable delay means connected to said phase-shifting means for receiving said second signal and for providing a variable delayed output third signal in response to a control fourth signal;

further delay means connected to said variable delay means for receiving said third signal and providing output fifth and sixth signals wherein said fifth signal is delayed more than said sixth signal;

second transducer means for providing an output seventh signal in response to received acoustic signals; and correlation means connected to said first and second transducer means and said delay means for receiving said third, fifth, sixth, and seventh signals and providing an apparatus output signal when the correlation between said sixth and seventh signals is greater than the correlation of said seventh signal with either of said third and fifth signals; said correlation means also providing the control fourth signal for application to said variable delay means to vary the delay of said third signal with respect to said second signal to maintain the correlation of said seventh and sixth signals at a higher level than the correlation of said seventh signal with either of said third and fifth signals.

6. Apparatus as claimed in claim 5 wherein said correlation means includes level detection means for providing said apparatus output signal only after the correlation between said sixth and seventh signals is greater than a predetermined minimum, and said correlation means further includes a sweep generator which continuously varies the control signal applied to said variable delay means until said apparatus output signal is supplied.

7. Apparatus as claimed in claim 6 comprising, in addition, further phase-shifting means for phase shifting said seventh signal to produce a quadrature phase shifted eighth signal, said correlation means integrating the correlation of said sixth and eighth signals for use as said control signal after said apparatus output signal is supplied.

8. A method for detecting a direct signal from among multipath signals received through a fluid medium from a signal source comprising the steps of:

scanning a volume in a direction perpendicular to a predetermined reference plane for a signal until a first signal is detected;

determining the angle relative to the reference plane from which the first signal arrives;

defining a smaller volume bounded by the reference plane and a surface at the angle of arrival of the first signal;

scanning the smaller volume for a signal until a second signal at a smaller angle relative to the reference plane than the first signal is detected;

alternately repeating the steps of defining successively smaller volumes between the reference plane and a surface at the angle of arrival of the last detected signal, and scanning the last defined volume for a signal at a smaller angle relative to the reference plane than the last detected signal until no further signal can be detected; and selecting the last detected signals as the direct signal from the signal source.

* * * * *